United States Patent
Clampitt et al.

(10) Patent No.: US 9,550,148 B2
(45) Date of Patent: Jan. 24, 2017

(54) HEAVY METAL REMOVAL

(71) Applicant: Paragon Waste Solutions, LLC, Golden, CO (US)

(72) Inventors: George Clampitt, Golden, CO (US); Fortunato Villamagna, Las Vegas, NV (US)

(73) Assignee: Paragon Waste Solutions, LLC, Golden, CO (US)

( * ) Notice: Subject to any disclaimer, the term of this patent is extended or adjusted under 35 U.S.C. 154(b) by 17 days.

(21) Appl. No.: 14/728,454

(22) Filed: Jun. 2, 2015

(65) Prior Publication Data
US 2016/0354723 A1    Dec. 8, 2016

(51) Int. Cl.
*B01D 53/64* (2006.01)
*B01D 53/81* (2006.01)
*B01D 53/82* (2006.01)

(52) U.S. Cl.
CPC ........... *B01D 53/64* (2013.01); *B01D 53/82* (2013.01); *B01D 2253/102* (2013.01); *B01D 2253/1122* (2013.01); *B01D 2257/60* (2013.01); *B01D 2257/602* (2013.01)

(58) Field of Classification Search
CPC ......... B01D 53/64; B01D 53/81; B01D 53/82; B01D 53/8665; B01D 2253/102; B01D 2253/104; B01D 2257/60; B01D 2257/602; B01D 2258/0283
See application file for complete search history.

(56) References Cited

U.S. PATENT DOCUMENTS

| 3,803,803 | A | * | 4/1974 | Raduly | B01D 53/64 95/134 |
| 4,479,443 | A | | 10/1984 | Faldt et al. | |
| 5,209,773 | A | * | 5/1993 | Audhe | B01D 53/02 423/210 |
| 5,607,496 | A | * | 3/1997 | Brooks | B01D 53/64 266/148 |
| 5,895,520 | A | * | 4/1999 | Rolke | B01D 53/02 95/132 |
| 6,221,128 | B1 | | 4/2001 | Giri | |
| 8,263,524 | B1 | | 9/2012 | Skandan et al. | |
| 8,329,614 | B2 | | 12/2012 | Chao et al. | |
| 8,481,455 | B1 | | 7/2013 | Jain et al. | |
| 8,551,218 | B2 | * | 10/2013 | Nielsen | B01D 53/04 95/128 |
| 2008/0135487 | A1 | * | 6/2008 | Kennard | B01D 15/00 210/661 |

FOREIGN PATENT DOCUMENTS

| CA | 2036746 | | 2/1992 | |
| GB | 1126215 A | * | 9/1968 | ............... A61L 9/01 |
| WO | 2009156761 A2 | | 12/2009 | |

* cited by examiner

Primary Examiner — Timothy Vanoy
(74) Attorney, Agent, or Firm — Holzer Patel Drennan (57) ABSTRACT

The method of capturing gaseous heavy metals disclosed herein includes exposing a stream of vapor including the gaseous heavy metals to a reactor bed of carbon (C) and aluminum (Al) in the form of pellets and granules. The gaseous heavy metals include mercury (Hg), mercury oxide (Hg$_x$O$_y$), and other heavy metals in ionized or oxidized form.

28 Claims, 7 Drawing Sheets

510 — Receive disposal material
512 — Generate vapor
514 — Mix vapor with fresh air
516 — Insert mixture into a reaction vessel at top end
518 — Pass mixture through plurality of media layers
520 — Exit the mixture through bottom end of the reaction vessel
522 — Exhaust the mixture through an exhaust channel
524 — Collect heavy metal deposits from the plurality of media layers

HEAVY METAL REMOVAL

FIELD

Implementations disclosed herein relate, in general, to information methods and systems for disposal of heavy metals.

DISCUSSION OF RELATED ART

Disposal of heavy metals from gaseous output generated as a result of waste disposal is a major problem in modern economies. As the consumption of products increase per capita, so does the generation of waste material. Various systems used for waste disposal include household waste disposal systems, industrial waste disposal systems, hospital waste disposal systems, etc. Typical household waste disposal systems include expensive and environmentally unfriendly trucking and landfill operations. Industrial waste from factories, refineries, etc., is generally disposed of using methods that involve burning the waste and generating hothouse gases such as carbon dioxide, methane, etc. These existing waste disposal systems are typically energy inefficient and environmentally unfriendly. Furthermore, due to the composition of the exhaust generated by such existing waste disposal systems, they do not meet various guidelines and requirements of the environmental protection agency (EPA).

SUMMARY

Implementations disclosed herein provide a system and method of capturing gaseous heavy metals by exposing vapor including heavy metal and heavy metal oxides to reactor bed in a reaction vessel, wherein the reactor bed includes multiple alternating layers of aluminum and carbon. Specifically, the method disclosed herein includes exposing a stream of vapor including the gaseous heavy metals to a reactor bed of carbon (C) and aluminum (Al) in the form of pellets and/or granules. The gaseous heavy metals include mercury (Hg), mercury oxide ($Hg_xO_y$), and other heavy metals in ionized or oxidized form. The stream of vapor can contain one or more heavy metal particulates and oxides or the one or more heavy metal particulates. The reaction vessel is configured to receive the stream of vapor at a vertically top end of the vessel at a predetermined pressure level. A plurality of layers of aluminum and carbon media causes the pressure to drop gradually as the stream of vapor travels from the top vertical end to the bottom end of the reaction vessel. Specifically, the layers of media are packed in a manner so at to reduce the amount of pressure drop across the vertical length of the reaction vessel. For example, the layer of C has C in form of granules and the layer of Al has Al in the form of ribbons. Each of these layers is formed to have a high level of porosity to reduce the drop in the pressure as the stream of vapor travels through the reaction vessel. Furthermore, each of these layers also provides high surface area so as to allow high exposure of the stream of vapor to C and Al.

BRIEF DESCRIPTION OF THE DRAWINGS

A further understanding of the nature and advantages of the present technology may be realized by reference to the figures, which are described in the remaining portion of the specification. In the figures, like reference numerals are used throughout several figures to refer to similar components.

DETAILED DESCRIPTION

Implementations of the present technology are disclosed herein in the context of a heavy metal removal system. In the following description, for the purposes of explanation, numerous specific details are set forth in order to provide a thorough understanding of the present invention. It will be apparent, however, to one skilled in the art that the present invention may be practiced without some of these specific details. For example, while various features are ascribed to particular implementations, it should be appreciated that the features described with respect to one implementation may be incorporated with other implementations as well. By the same token, however, no single feature or features of any described implementation should be considered essential to the invention, as other implementations of the invention may omit such features.

In the interest of clarity, not all of the routine functions of the implementations described herein are shown and described. It will, of course, be appreciated that in the development of any such actual implementation, numerous implementation-specific decisions should be made in order to achieve the developer's specific goals, such as compliance with application—and business—related constraints, and that those specific goals will vary from one implementation to another and from one developer to another.

Figure 1:
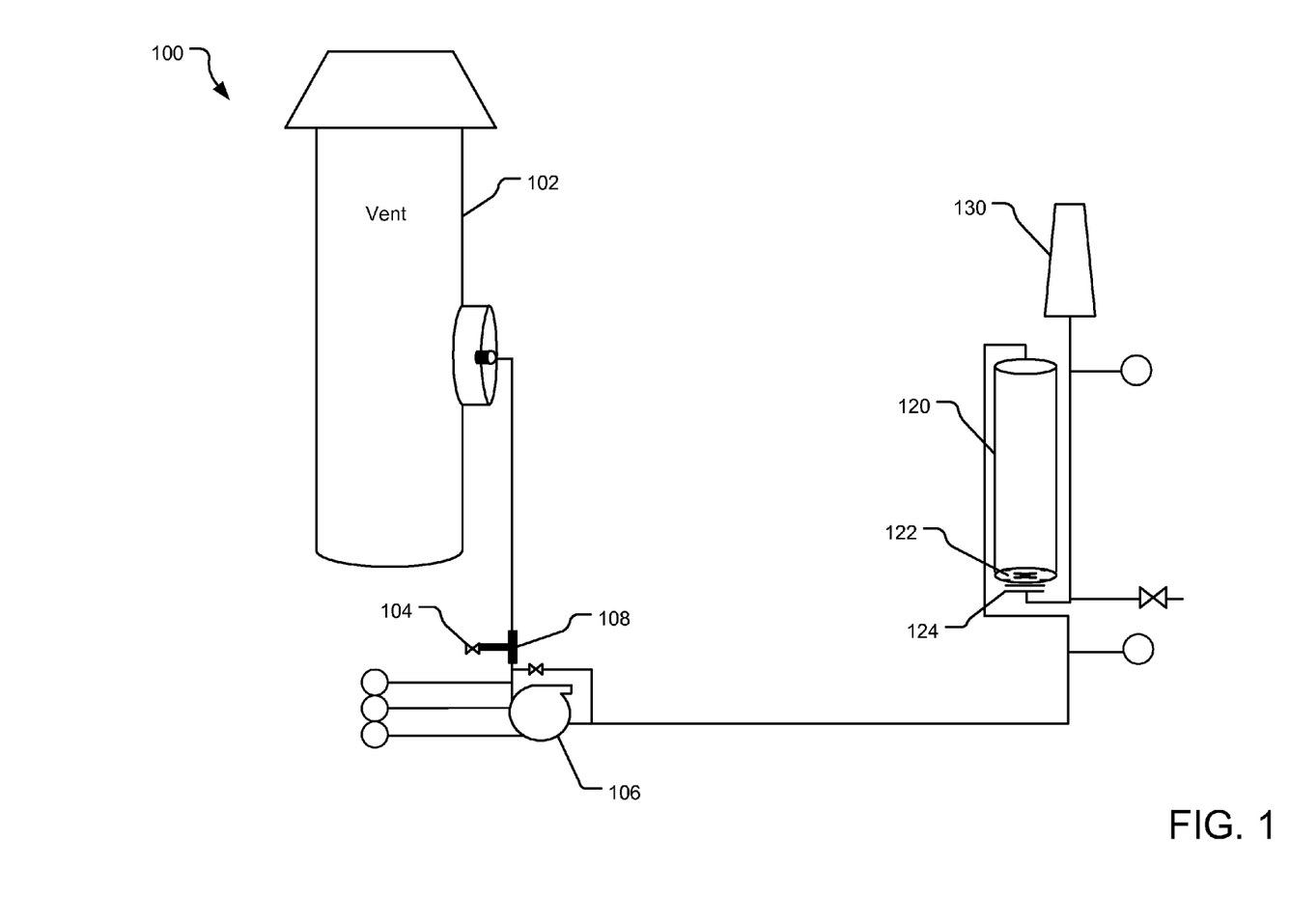
FIG. 1 illustrates a first example block diagram for a heavy metal removal system.

FIG. 1 illustrates a first example block diagram for a heavy metal removal system 100. A heavy metal removal system disclosed herein exposes a stream of vapor including the gaseous heavy metals to a reactor bed of carbon (C) and aluminum (Al) in the form of pellets, ribbons and granules to remove the heavy metal from the stream of vapor. A waste material containing variable amounts of heavy metals is placed in the pyrolysis chamber of a waste destruction unit (not shown). The pyrolysis portion of the process vaporizes the waste in the chamber. The smoke from the waste, containing heavy metal vapor, is then pulled into a plasma chamber (not shown) where it is further oxidized.

The oxidized smoke enters a vent 102, from where it is exhausted to the atmosphere. A stream of the smoke containing the heavy metals is pulled from the vent 102 via a blower 106 and pumped into a reaction vessel 120. For example, the stream of vapor pulled from the vent 102 may include various gaseous heavy metals, including mercury (Hg), arsenic (As), cadmium (Cd), lead (Pb), etc. Furthermore, the stream may also include oxides of the heavy metals, including mercury oxide ($Hg_xO_y$). Yet alternatively, the stream of vapor may further comprise (i) organic mercury salt ($Hg_xC_y$) and (ii) inorganic mercury salts ($Hg_xCl_y$), ($Hg_xS_y$), etc. Note that the method of removal for the salts may be different from the amalgam process of elemental/oxidized Hg.

Because the temperature of the gas pulled from the vent 102 is significantly high, the stream of vapor from the vent 102 is diluted by fresh air injected from a fresh air valve 104 (also referred to as the "dilution valve") before the stream enters the blower 106. The fresh air valve 104 may be connected to the stream intake via a Y connection 108. The combined mixture of air from the fresh air valve 104 and the stream of vapor from the vent 102 is forced by the blower 106 into the reaction vessel (also referred to as the "scrubber") 120.

Various techniques are utilized here to minimize temperature and to maximize heavy metal vapor concentration input to the reaction vessel 120. For example, in one implementation, a valve connecting the blower 106 to the vent 102 is opened and the fresh air valve 104 is throttled to a minimum. This forces the blower 106 to pull a higher vacuum on the vent 102 and put less pressure on the reaction vessel 120, resulting in maximum heavy metal concentrations in the stream of vapor entering the reaction vessel 120 and minimum dilution via a "Y" 108 and fresh air valve 104. The inlet temperatures to the blower 106 less than 200 F (at which point the grease inside the bearing of the blower begins to melt). In one implementation, the reaction vessel 120 may be configured such when the stream of vapor enters the reaction vessel 120, it expands in volume by at least 2-5 times. Such expansion allows decrease in temperature of the stream of vapor and/or decrease in the pressure of the stream of vapor.

The reaction vessel 120 includes various layers of media (not shown) including layers of aluminum (Al) and carbon (C). The proportion of the Al and C in the media layers may vary within a wide range, such as for example, 9:1 Al:C to 1:9 Al:C. In one implementation, the Al is in the form of Al shavings, which maximizes the contact between the stream traveling through the reaction vessel 120 and the Al media. Other implementation may use Al in different form, such as ribbons. For example, the Al ribbons may be in the form of drill shavings. Al in the form of ribbons can have a porosity in the range of 1% to 40%. Yet alternatively, Al in other form that provides a large surface area per unit weight (e.g., 1 m^2/g) and high porosity (e.g., 10%) can be used. For example, Al in the form of aluminum foam can have a porosity of 40% to 99%. Alternatively, the surface area of the Al may have different geometry and surface area per unit weight of as much as 1000 m^2/g. To achieve such high surface area, the ribbons of Al may be of a very fine thickness. Alternatively, the reactor bed may comprise Al in the form of an Al membrane having a porosity of 10% to 99%. The implementation disclosed herein provides a bed of ribbons for the smaller ribbons/pellets/granules of Al to nestle into.

The C can be in the form of pellets or other form that provides high amount of surface area (e.g., 100 m^2/g) per unit weight of C. In one implementation an activated carbon is used as the C media. Yet alternatively, a combination of C and activated C may be used in the media. Furthermore, the C can be halogenated carbon. Such halogenated carbon may be used in conjunction or in place of activated carbon. When halogenated carbon is used, the system may also include one or more solutions to capture and/or remove unwanted byproducts generated by the process.

The stream of vapor is forced into the reaction vessel 120 at the top of the reaction vessel 120 and it travels through the reaction vessel 120 towards the bottom in a vertical direction, while coming in contact with the layers of Al and C. The configuration of the layers of Al and C is further illustrated in FIG. 2 below. In one implementation, the stream of vapor is exposed to the reactor bed at a flow rate in the range of 1 SCFM and 10,000 SCFM. Furthermore, the temperature of the reaction vessel 120 is also controlled to be in the range of 50 F and 2000 F. The combination of the temperature and the flow rate within these ranges results in gradual decline of the pressure as the steam of vapor travels through the reaction vessel 120 and results in high level of reaction between the heavy metals and the media. The heavy metals are scrubbed by being deposited on the media. The reaction causing the scrubbing of the heavy metals on to the media can be provided as below:

Here the mercury in the form of vapor Hg(v) is exposed to media layers of Al(s) and C(s) and the mercury deposits on the media layers of Al(s) and C(s) in the form of Hg(s).Al(s) and H(g).C(s). (Here (s)=solid i.e. (l)=liquid, (g)=gas, (v)=vapor. The dot product on the right side of the equation above represents the combination of Hg with Al/C in solid form). In one implementation, as the stream of vapor including heavy metal and heavy metal oxides travels through the reaction vessel 120, a pressure level above a threshold is maintained. For example, the pressure level of the stream traveling through the reaction vessel 120 may be in the range of 0.1 psi to 10 psi. The form of the medial layers having high porosity helps in maintaining the pressure drop across the reaction vessel 120 below a threshold. Furthermore, the flow rate of the stream of vapor through the reaction vessel 120 is also maintained within a predetermined range. For example, the flow rate may be maintained between 1 standard cubic feet per minute (SCFM) and 10,000 SCFM. The relation between the pressure and airflow is illustrated by a graph in FIG. 3 displaying various combinations of pressure and airflow through the reaction vessel. The combinations of the pressure and the airflow together with the presence of Al and C with high surface area results in deposition of various metals on the media surface.

An implementation of the reaction vessel 120 includes a support mechanism 122 located at the bottom of the reaction vessel 120. The support mechanism 122 may comprise more than one layer. In an example, the support mechanism 122 may include a bottom filter (or sieve) having a porous surface that prevents the media from the reaction vessel 120 from falling there through. However, such filter may allow the vapor passing through the reaction vessel 120 to escape. Furthermore, the support mechanism 122 may also include stainless steel wool on top of the filter such that the stainless steel wool supports the media sitting on top of the steel wool. As a result, the media is prevented from clogging the pores of the filter.

An implementation of the reaction vessel also includes an orifice plate 124 adjacent to the filter 122. The orifice plate 124 may be made of stainless steel or iron. Because the orifice plate 124 is made of iron or stainless steel, it does not form any amalgam with any heavy metals, such as mercury. The orifice plate may be configured to sit up on legs and allow a gap between the bottom of the reaction vessel 120 and an exit flange connection. The orifice plate 124 allows further pressure drop as the stream of vapor exits the reaction vessel 120. The stream of vapor exiting from the reaction vessel 120 is then exhausted to the atmosphere via an exhaust channel 130. The reaction vessel 120 may be made of iron or stainless steel. Because the heavy metals being captured by the media layers of the reaction vessel 120 generally do not form an amalgam with iron, the use of iron for the reaction vessel 120 results in more heavy metal vapors being captured by the media layers.

The amount of heavy metals in the stream of vapor entering the reaction vessel 120 and the stream of vapor exiting the reaction vessel 120 may be measured to determine the amount of heavy metals being captured in the reaction vessel. For example, the level of mercury in the stream of vapor may be measured using the Jerome mercury analyzer.

Figure 2:
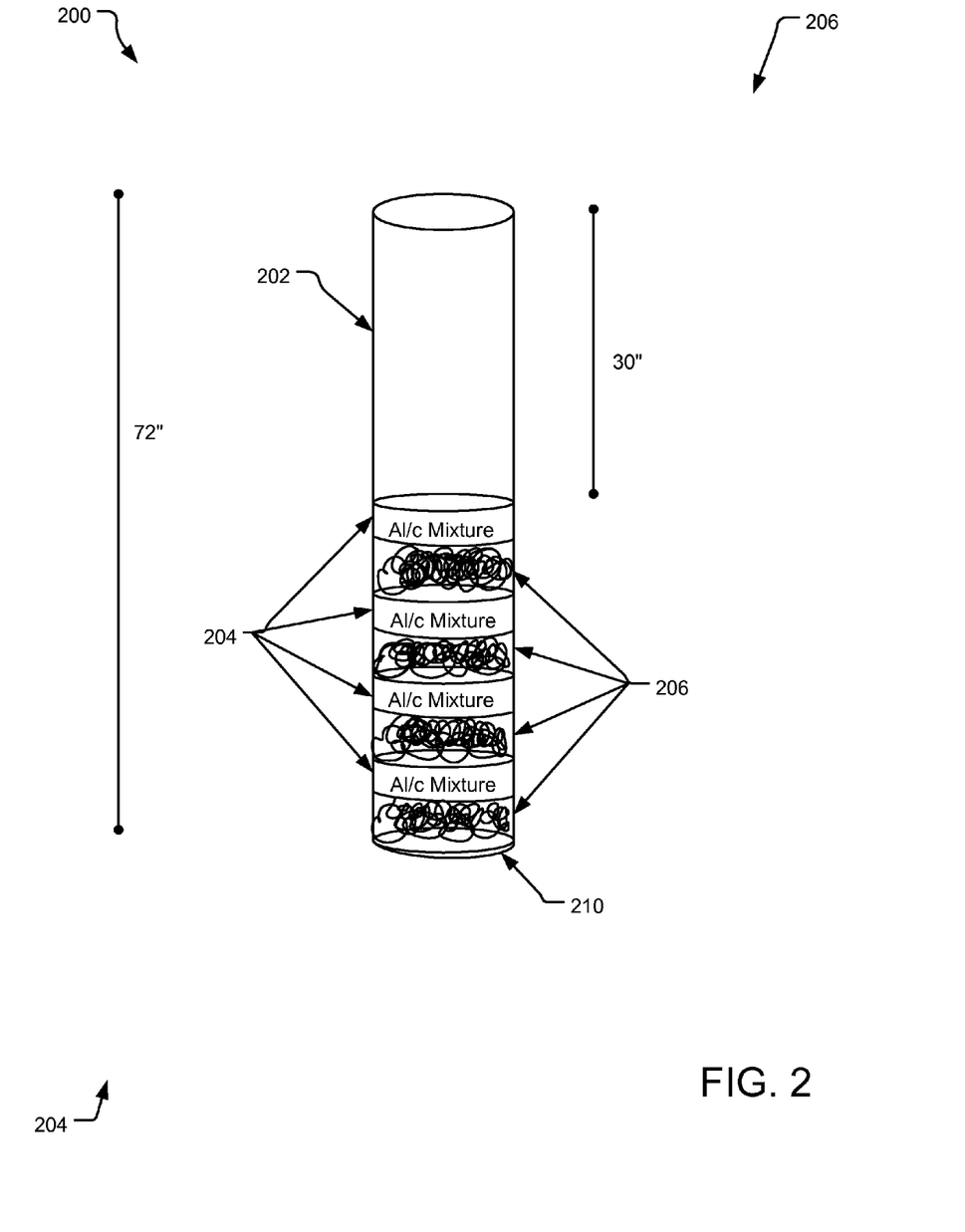
FIG. 2 illustrates an example implementation of a reaction vessel including media layers for absorbing heavy metals.

FIG. 2 illustrates an example implementation 200 of a reaction vessel 202 including media layers for absorbing heavy metals. The example implementation illustrates Al/C mixture layers 204 and Al ribbon layers 206. Note that while the illustrated implementation discloses four mixture layers 204 and four Al ribbon layers 206, an alternate number of layers may also be provided. Furthermore, while the illustrated implementation has a mixture layer 204 on top, alternatively, the top layer may be an Al ribbon layer 206. For example, in one implementation, the ribbon layer 206 is made of drill shavings from a scrap yard, where the drill shavings vary in size of ribbon length from a few centimeters to 1-2 feet. This provides a bed for the mixture layer 204 to rest on so as not to stick together and plug the reaction vessel 202.

The illustrated arrangement of media layers in the reaction vessel 202 uses approximately six pounds of total Al ribbons, with approximately 1.5 pounds of Al ribbon per each Al ribbon layer 206. The combined mixture layers 204 have 50 pounds of Al and C granules (including 25 pounds of Al granules and 25 pounds of C granules). The C granules and Al granules may be in the form of pellets. Thus, each of the mixture layers 204 includes approximately 12.5 pounds of mixture. Note that while the amount of Al granules is substantially equal to the amount of C granules, in alternative implementations, a different percentage weight may be provided.

The arrangement of media layers 204 and 206 allows generating a low pressure drop in the range of 0.1 to 10 psi inside the reaction vessel 202. In alternative implementation, the pressure drop may be in the range of 1-2 psi. Specifically, the arrangement of the alternate layers of the mixture layer 204 and the Al ribbon layer 206 causes controlled drop in the pressure as the vapor with the high metals travels through the reaction vessel 202. A support mechanism 210 located at the bottom of the reaction vessel 202 provides support to the media from the layers 204 and 206.

Figure 3:
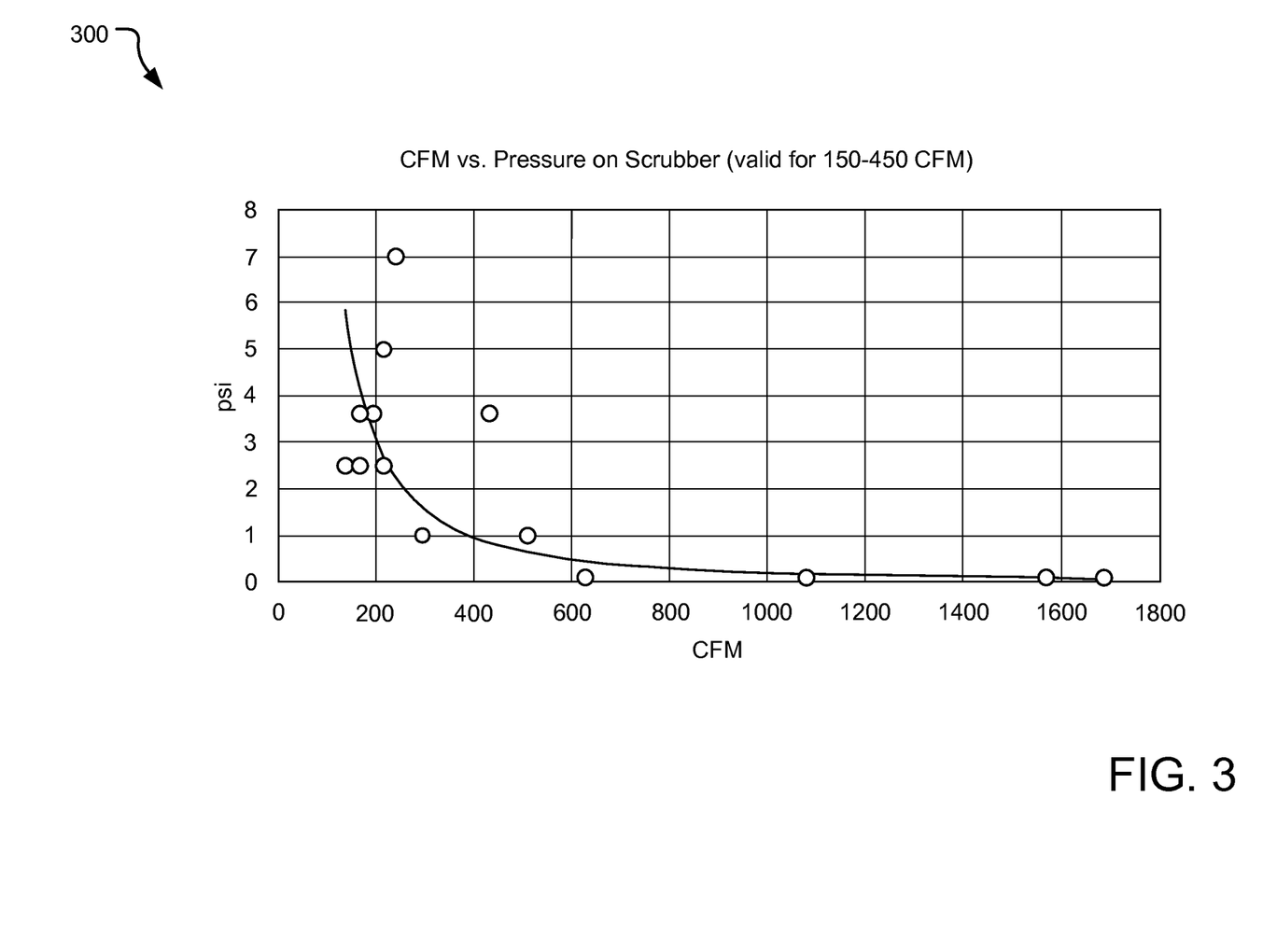
FIG. 3 illustrates an example graph of various combinations of airflow and pressure of the stream in a reaction vessel.

FIG. 3 illustrates an example graph 300 of various combination of airflow and pressure of the stream in a reaction vessel. Specifically, the graph 300 illustrates the relation between flow rate of the stream of vapor in cubic feet per minute (CFM) and the pressure measured at an exit end of the blower (which is substantially similar to the pressure at the beginning or the top of the reaction vessel) in pounds per square inch (psi). Thus, for example, keeping the pressure above 1 psi allows resulting flow rate approximately in the range of 150-450 CFM.

Figure 4:
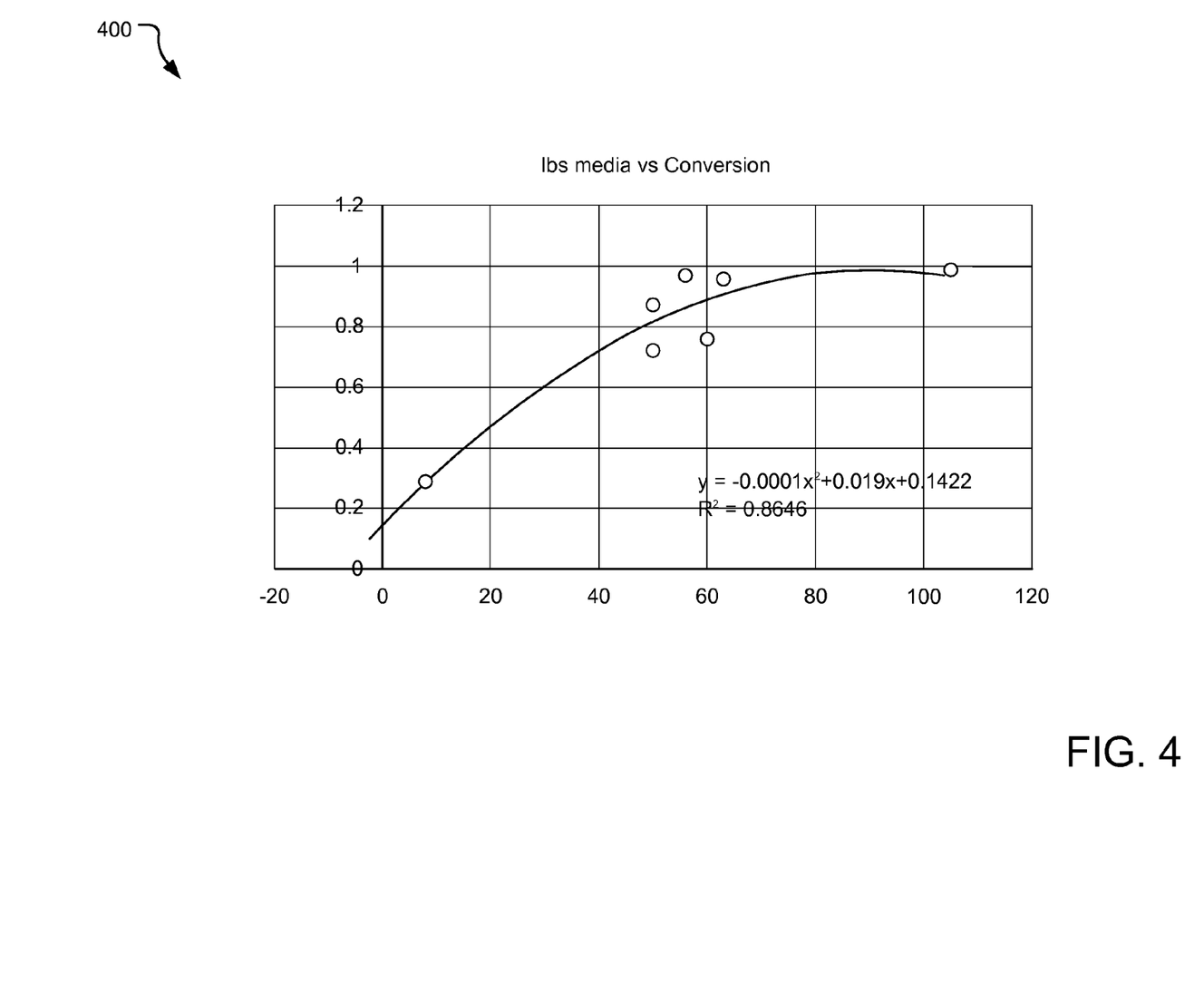
FIG. 4 is a graph illustrating relation between the amount of media used in the reaction vessel and the level of conversion of the heavy metals.

FIG. 4 is a graph 400 illustrating relation between the amount of media used in the reaction vessel and the level of conversion of the heavy metals. Specifically, the graph 400 illustrates that as more media is used (as illustrated by pounds on the x-axis) more heavy metals are captured (as illustrated by the percentages on the y-axis, with 1 being 100%).

Figure 5:
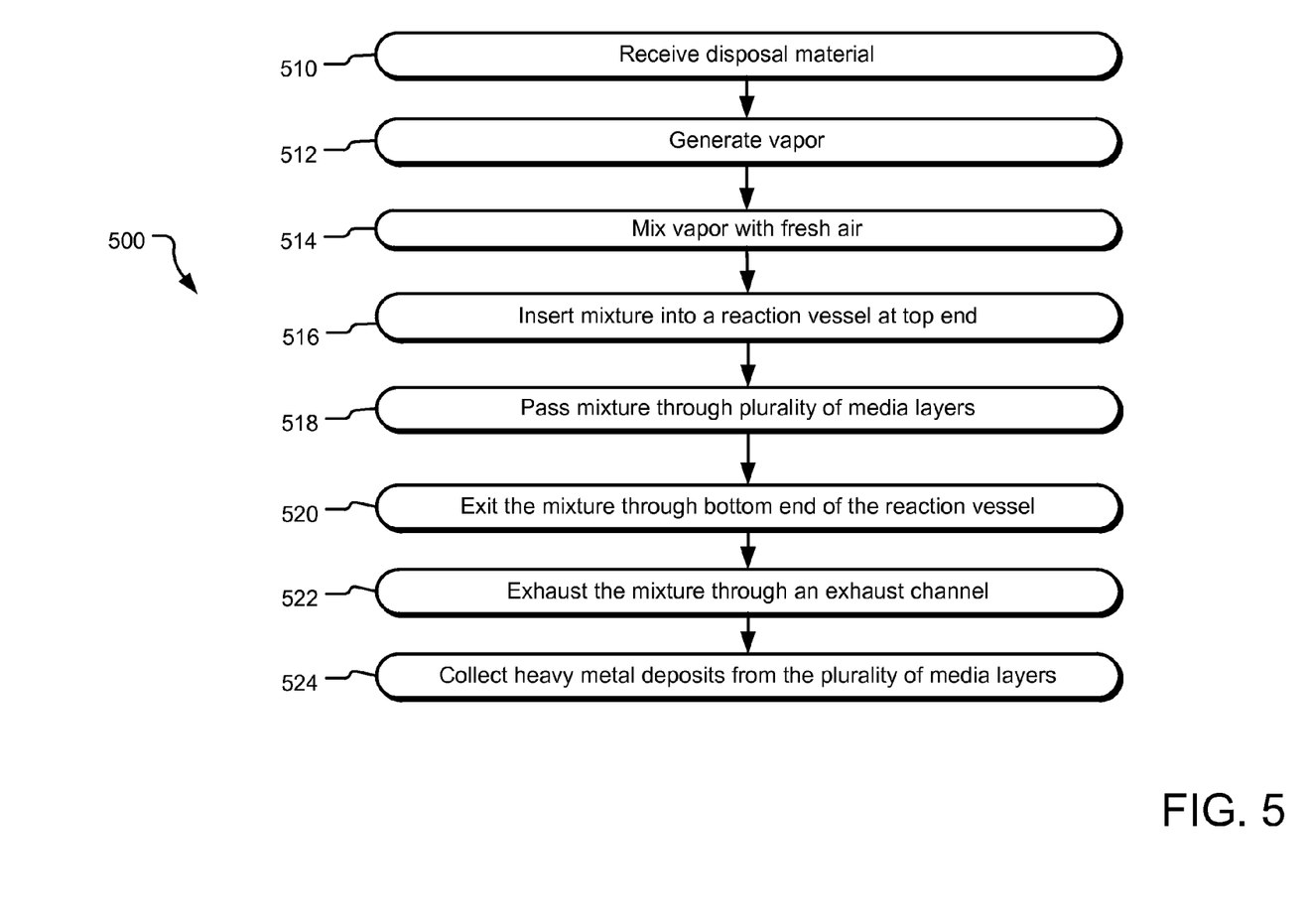
FIG. 5 illustrates example operations used by the heavy metal removal system disclosed herein.

FIG. 5 illustrates example operations 500 used by the waste disposal system used herein. An operation 510 receives disposal material in a waste disposal system. For example, such disposal material maybe, for example, chemical waste, fugitive emissions, regulated medical waste, refinery waste, etc. An operation 512 generates vapor from the disposal material wherein the vapor may include various heavy metals, such as arsenic (As), Cadmium (Cd), lead (Pb), beryllium (Be), chromium (Cr), manganese (Mn), radium (Ra), selenium (Se) and an oxide of at least one of the As, Cd, Pb, Be, Cr, Mn, Ra, and Se. In one implementation, a pyrolysis chamber or a plasma chamber may be used to generate the vapor from the disposable material.

An operation 514 mixes the vapor from an intake of fresh air. For example, an intake valve or dilution valve may be used for inserting fresh air to the stream of vapor including the heavy metals. The intake of fresh air may be controlled so as to maintain the pressure and temperature of the mixture of the stream of vapor and the fresh air to a predetermined range.

An operation 516 inserts the mixture of the stream of vapor and the fresh air to a reaction vessel or a scrubber at a vertically top end of the reaction vessel. An operation 518 passes the mixture through a series of reactor beds made of media layers. In one implementation, the media layers may be made of alternative layers of C/Al mixture and Al ribbons. The layer of C/Al mixture may be made of pellets or granules of C and Al.

An operation 520 exits the stream of vapor through a vertically bottom end of the reaction vessel. The exiting stream is analyzed for levels of heavy metals and an operation 522 exhausts the stream of vapor though an exhaust channel. An operation 524 collects heavy metal deposits from the various media layers of the reaction vessel. Similar to Iron sponge the media is used to exhaustion. Once "breakthrough" is reached the media is spent and must be replaced.

Figure 6:
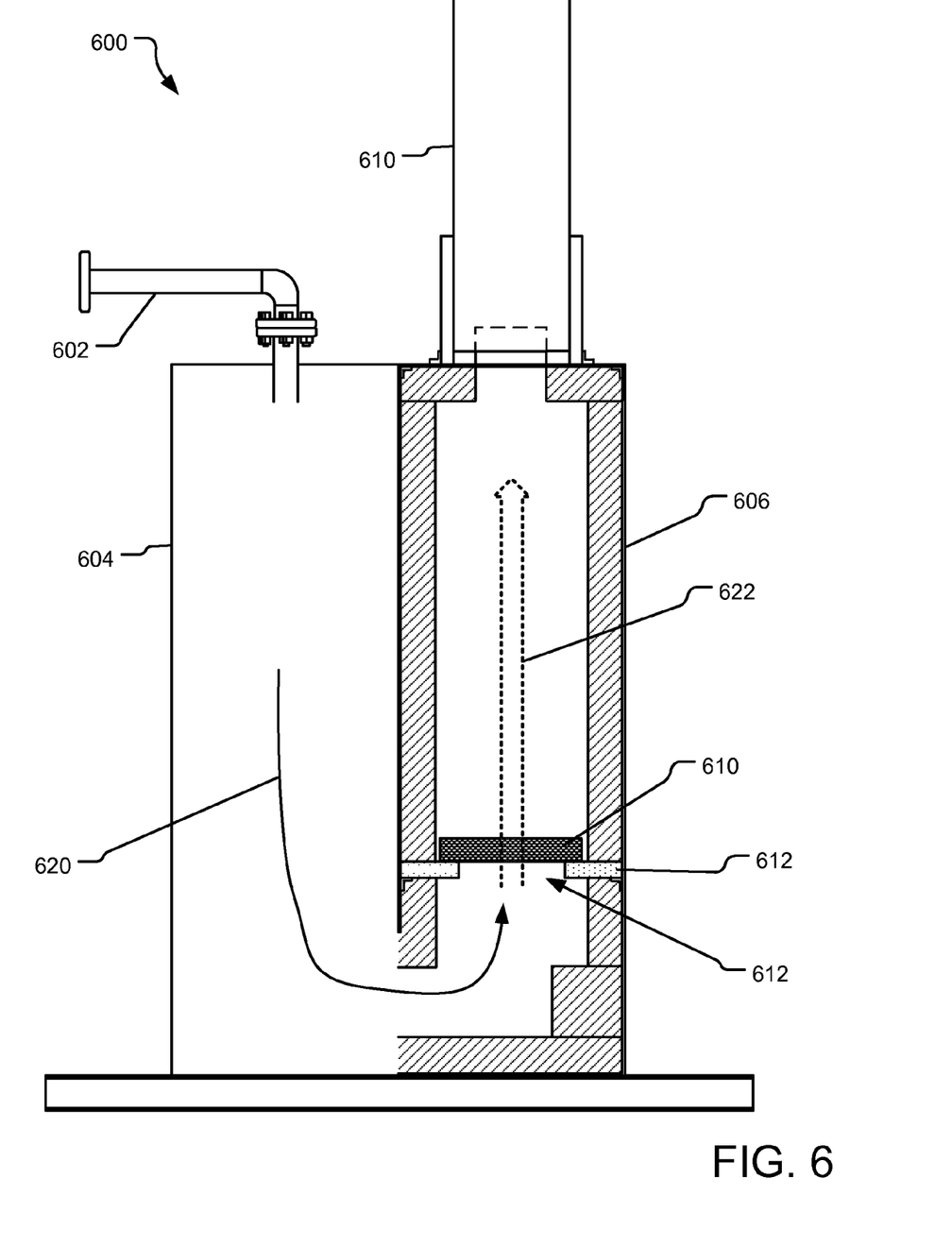
FIG. 6 illustrates an alternative example implementation of the heavy metal removal system disclosed herein.

FIG. 6 illustrates an alternative implementation of a reaction vessel system 600 wherein the flow of the stream of vapor containing the heavy metals is different compared to the various implementations discussed above. Specifically, in the reaction vessel system 600 includes a first chamber 604 that generates the stream of vapor containing heavy metals or heavy metal vapor and the stream of vapor is introduced into a reaction vessel 606 from an opening 608 approximately near the bottom of the reaction vessel 606. The reaction vessel 606 is configured with a layer of media 610 on support shelves 612.

In the illustrated implementation, waste material may be introduced into the first chamber 604 via an input 602. The first chamber may be, for example, a plasma chamber that generates the stream of vapor containing the heavy metals. An arrow 620 illustrates the flow of the stream of vapor. Once the stream of vapor enters the reaction vessel 606 it travels in the upward direction as illustrated by 622. During its traversal through the media 610, various heavy metals may be deposited on the layers of carbon and Al within the media 610. The stream of vapor is exhausted through an exhaust 610.

Figure 7:
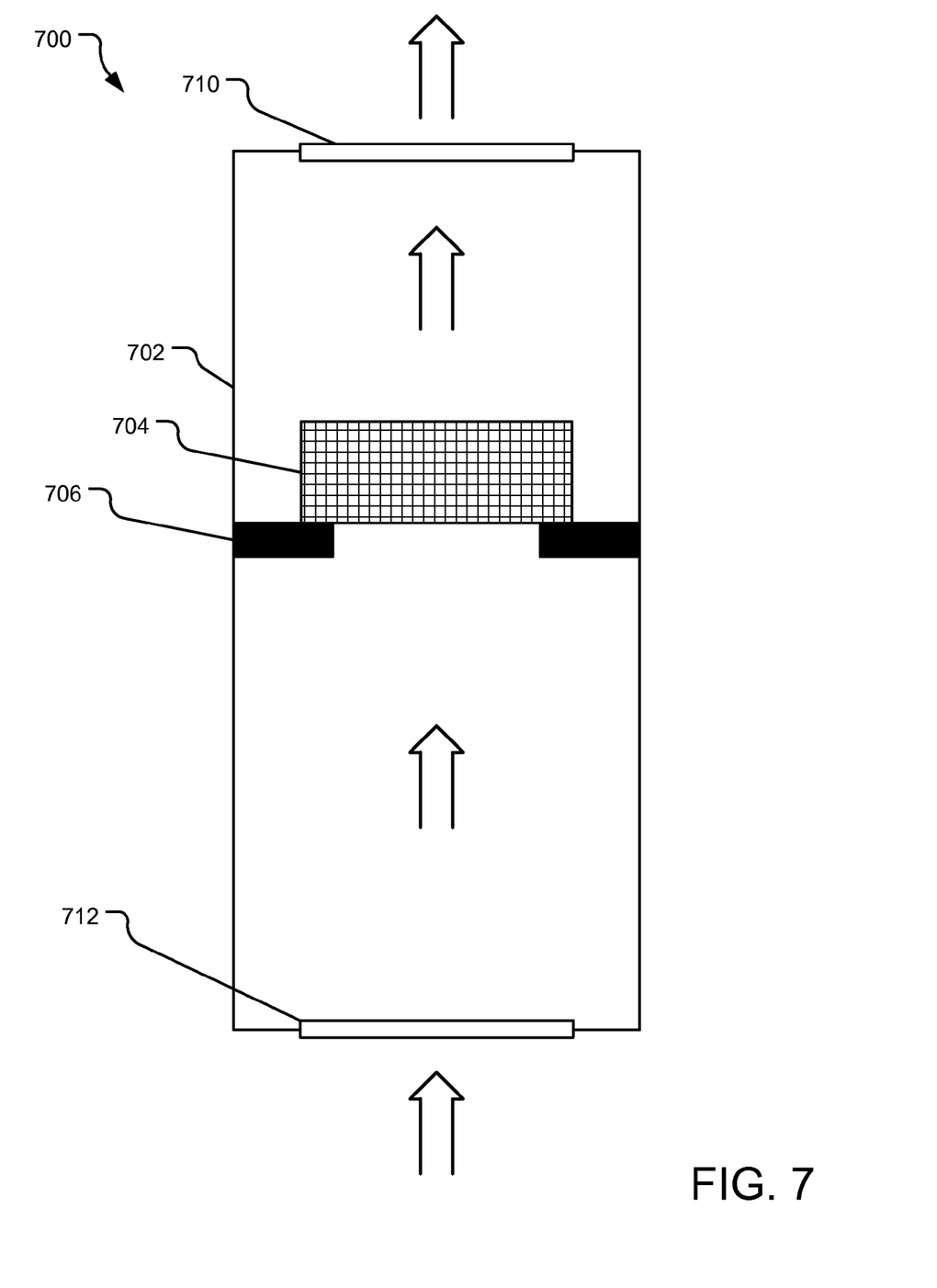
FIG. 7 illustrates an example configuration of media in a heavy metal removal system disclosed herein.

FIG. 7 illustrates an alternative example 700 of the media in a reaction vessel 702. The reaction vessel 702 allows stream of vapor to travel there through in an upward direction. Specifically, the stream of vapor enters the reaction vessel 702 from a bottom opening 712 and exits through a top opening 710. The reaction vessel 702 includes a media 704 including layers of C and Al, wherein the media is supported by a support shelf 706. The support shelf 706 allows for a convenient replacement of media 704. As the stream of vapor travels through the media 704, various heavy metals, including mercury may be deposited on the layers of Al and C. Stream of vapor with reduced amounts of heavy metals exits through the top opening 710.

The above specification, examples, and data provide a complete description of the structure and use of exemplary implementations of the invention. Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A method of capturing gaseous heavy metals, the method comprising:
   generating smoke by vaporizing waste material in a pyrolysis chamber;
   oxidizing the smoke in a plasma chamber to generate a stream of vapor including the gaseous heavy metals; and
   exposing the stream of vapor including the gaseous heavy metals to a reactor bed of carbon (C) and aluminum (Al) in the form of pellets, ribbons or granules.

2. The method of claim 1, wherein the gaseous heavy metals includes at least one of mercury (Hg) and a mercury oxide ($Hg_xO_y$).

3. The method of claim 2, wherein the stream of vapor further comprises at least one of arsenic (As), Cadmium (Cd), lead (Pb), beryllium (Be), chromium (Cr), manganese (Mn), radium (Ra), selenium (Se) and an oxide of at least one of the As, Cd, Pb, Be, Cr, Mn, Ra, and Se.

4. The method of claim 2, wherein the reactor bed further comprises Al in the form of aluminum foam having a porosity of 40% to 99%.

5. The method of claim 1, wherein exposing the stream of vapor further comprises exposing the stream of vapor to multiple alternating layers of C and Al.

6. The method of claim 1, further comprising:
   exposing the stream of vapor to the reactor bed at a flow rate of at least 1 SCFM.

7. The method of claim 1, further comprising:
   exposing the stream of vapor to the reactor bed at a flow rate within a temperature range of 50 F and 2000 F.

8. The method of claim 1, wherein the reactor bed further comprises Al in the form of ribbons.

9. The method of claim 8, wherein the reactor bed further comprises Al in the form of ribbons having surface area of at least 1 m^2/g to 1000 m^2/g.

10. The method of claim 8, wherein the reactor bed further comprises Al in the form of ribbons having porosity in the range of 1% to 40%.

11. The method of claim 8, wherein the reactor bed further comprises C in the form of granules having surface area of at least 100 m^2/g to 5000 m^2/g.

12. The method of claim 1, wherein the reactor bed further comprises C in the form of at least one of granules, pellets, fiber, powder, and extruded carbon.

13. The method of claim 1, wherein the reactor bed further comprises C in the form of agglomerates.

14. The method of claim 1, wherein exposing a stream of vapor further comprises exposing a stream of vapor to the reactor bed for at least 3 seconds.

15. The method of claim 1, further comprising exposing the stream of vapor to the reactor bed within a pressure range of 0.1 to 10 psi.

16. The method of claim 1, wherein the reactor bed comprises Al in the form of Al membrane having a porosity of 10% to 99%.

17. A system for removing heavy metals, the system comprising:
   a reaction vessel configured to receive a stream of vapor from its vertically top end and to release the vapor from its bottom end; and
   a plurality of media layers configured within the reaction vessel, the plurality of media layers including one or more mixture layers including a combination of aluminum and carbon granules and one or more aluminum ribbon layers, wherein the one or more mixture layers and the one or more aluminum ribbon layers are arranged alternatively along the vertical length of the reaction vessel.

18. The system of claim 17, wherein the stream of vapor contains one or more heavy metal particulates and oxides or the one or more heavy metal particulates.

19. The system of claim 18, further comprising a blower configured to force the stream of vapor comprising heavy metal particles into the reaction vessel at a predetermined pressure level.

20. The system of claim 17, further comprising a support mechanism located at the bottom end of the reaction vessel, the support mechanism configured to support the media layers.

21. The system of claim 20, wherein the support mechanism comprises a stainless steel wool on top of a filter.

22. The system of claim 17, wherein the plurality of media layers is configured to cause pressure within the reaction vessel to drop a maximum of 1-2 psi from near the top end of the reaction vessel to the bottom end of the reaction vessel.

23. The system of claim 17, wherein the reaction vessel is configured to expose the stream of vapor to the plurality of media layers at a flow rate of at least 1 SCFM.

24. The system of claim 17, wherein the reaction vessel is made of at least one of iron and stainless steel.

25. The system of claim 17, wherein the reaction vessel is configured to expand the stream of vapor to at least 2-5 times as the stream of vapor enters the reaction vessel.

26. The system of claim 17, wherein the plurality of media layers comprises layers including different ratios of Al and C within a range of 9:1 Al:C to 1:9 Al:C.

27. A method of capturing gaseous heavy metals from a vapor stream, the method comprising:
   exposing the vapor stream including the gaseous heavy metals to a reactor bed of alternating layers of carbon (C) and aluminum (Al), the Al layer comprising Al ribbons.

28. The method of claim 27, wherein the C layer comprises a mixture of C and Al pellets, ribbons or granules.

* * * * *